July 3, 1962    D. F. BUSCH    3,042,818
STEPPING MOTOR
Filed Dec. 22, 1958

*INVENTOR*
DONALD F. BUSCH

BY
*AGENT*

3,042,818
STEPPING MOTOR
Donald F. Busch, Vestal, N.Y., assignor to International Business Machines Corporation, New York, N.Y., a corporation of New York
Filed Dec. 22, 1958, Ser. No. 782,220
7 Claims. (Cl. 310—49)

This invention relates to stepping motors and more particularly to an improved pulse responsive stepping motor.

The invention discloses a pulse responsive stepping motor of improved structure which is relatively easy to build and composed of a minimum number of wearable, movable parts. The disclosed stepping motor is positive in operation and fast acting because the mass of the rotor is small and readily responds to the motivating magnetic flux.

The principal object of the invention is to produce an electromagnetic pulse responsive stepping motor which utilizes magnetic torque for driving a rotatable element in the absence of mechanical means such as ratchets or the like.

Another object of the invention is to provide a motor which can operate at fast speeds.

A further object of the invention is to provide a stepping motor which is characterized by economy and reliable operation.

A still further object of the invention is to provide a stepping motor having a minimum number of moving parts.

Another object of the invention is to provide a stepping motor which is quiet in its operation.

Other objects of the invention will be pointed out in the following description and claims and illustrated in the accompanying drawings, which disclose, by way of examples, the principle of the invention and the best mode, which has been contemplated, of applying that principle.

In the drawings.

Like parts are designated by like reference numerals throughout the drawings. Known details and elements will be described only to the extent required for conveying an understanding of the invention.

Figure 1:
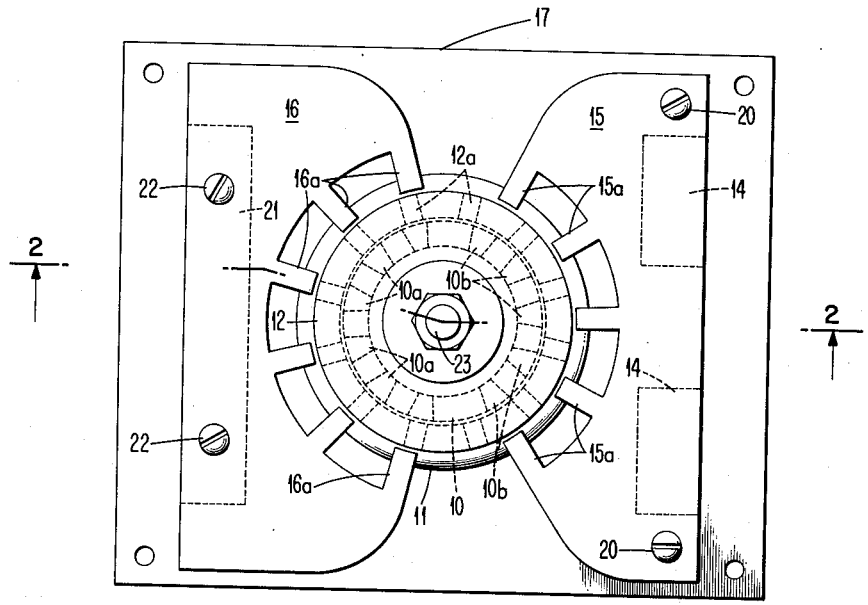
FIG. 1 is an end view of the stepping motor showing the rotor in an electromagnetically energized position.
Figure 2:
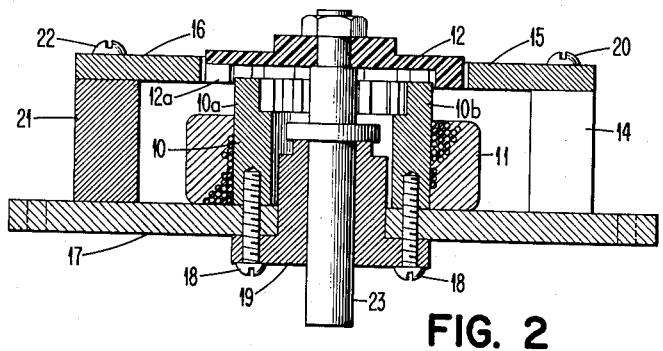
FIG. 2 is a sectional view of the stepping motor along the line 2—2 of FIG. 1.
Figure 3:
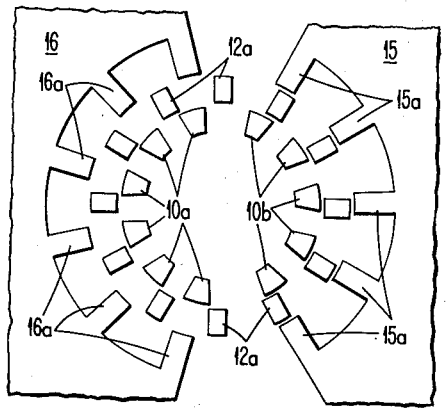
FIG. 3 is a schematic view of the stator and rotor elements as positioned by the influence of the permanent magnet field.

The embodiment of the invention represented in FIGS. 1-3, inclusive, comprises a hollow core 10, an electric coil 11, a rotor 12 having embedded magnetizable slugs 12a, a permanent magnet 14, a permanent magnet pole piece 15, a pole piece 16, and a mounting plate 17. Details of the embodiment are described below. The hollow or tubular magnetizable core 10, having two sets of projecting teeth 10a and 10b, is secured to the mounting plate 17 by means of the screws 18. The mounting plate 17 is of magnetizable material having high permeability and low residual characteristics. A rotor bearing 19 is also secured to the mounting plate 17 by means of the screws 18. An electrically energizable toroidal coil 11 surrounds the hollow core member 10 to form an electromagnet.

The permanent magnet 14 and its associated pole piece 15 is secured to the mounting plate 17 by means of two screws 20. The inner portion of the stationary pole piece 15 is arcuately shaped and is provided with a plurality of angularly disposed and inwardly directed projections 15a. Diametrically disposed to the pole piece 15 is another stationary pole piece 16 displaced in spaced relationship to the mounting plate 17 by means of a spacing block 21 and secured to the mounting plate 17 by means of two screws 22. The inner portion of pole piece 16 is arcuately shaped and is provided with a plurality of angularly disposed and inwardly directed projections 16a. In the preferred embodiment, the permanent magnet pole piece 15 has five projections 15a uniformly spaced at 30° intervals. The pole piece 16 has six projections uniformly spaced at 30° intervals. The pole pieces 15 and 16 are diametrically disposed so that the center line of the projections of pole piece 16 will be displaced by 15° on either side of a center line which passes through the projections of the permanent magnet pole piece 15.

In the preferred embodiment, the projecting teeth 10b on one-half of the stationary hollow core 10 are arranged to correspond with the projections 15a of the permanent magnet pole piece 15 and on the other side the projecting teeth 10a are arranged to correspond with the projections 16a of the pole piece 16. The radially extending center line of the projections 10a and 10b, in each instance, is displaced from the center line of the corresponding pole piece projection by a few degrees in a counterclockwise direction which in the preferred embodiment is 3°. This is done to control the direction of rotation of the rotor 12, as will become more evident later in the description.

The plastic rotor element 12 of low mass includes a plurality of magnetizable slugs 12a angularly disposed and embedded at the periphery of the rotor 12. The slugs 12a are concentrically arranged with respect to the projecting teeth 10a and 10b of the hollow core 10 and the projections 15a and 16a of the pole pieces 15 and 16, respectively, and adapted for magnetic coaction therewith. The rotor 12 is attached to a shaft 23 that is journaled in the bearing 19.

When the stepping motor is not energized, the magnetic flux produced by the permanent magnet 14 causes the rotor slugs 12a to move into alignment with the projections 15a and 10b, as shown by FIG. 3. The permanent magnet flux path (FIG. 2) produced by the permanent magnet 14 is through the permanent magnet pole piece 15 and its projections 15a, the aligned slugs 12a of rotor 12, the projections 10b, the hollow core 10, the mounting plate 17 and the permanent magnet 14.

When the coil 11 is energized, a magnetic field is produced which opposes the permanent magnet field and creates a new effective flux path. The electromagnetic flux path (FIG. 2) is through the core 10, the projections 10a, the slugs 12a of the rotor 12, the projections 16a, the pole piece 16, the spacing block 21, and the mounting plate 17 to the hollow core 10. The electromagnetic flux created by the coil 11 leaves the core 10 from projections 10a and 10b. The flux from the projections 10a creates an attracting force for the adjacent slugs 12a of rotor 12. Flux from the permanent magnet 14 also leaves the pole piece 15 from the projections 15a, causing the adjacent slugs 12a of rotor 12 to be repelled. With reference to FIG. 3 when the coil 11 is energized, magnetic flux paths will be established from the projections 10a through the adjacent rotor slugs 12a to the adjacent pole piece projections 16a. However, the greatest concentration of flux from the projections 10a will be to the rotor slugs 12a on the counterclockwise side because of the counterclockwise displacement of projections 10a previously described, and then to the projection 16a on the clockwise side of each of the slugs 12a. The rotor 12 will therefore be attracted and moved in a clockwise direction. On the opposite side of the rotor 12, the like polarities existing in projections 10b and 15a will cause a repelling force on the slugs 12a which will be in a clockwise direction because of the counterclockwise displacement of projections 10b previously described. The rotor 12 will accordingly move to a position as indicated by FIG. 1. Referring to FIG. 1, a similar attracting magnetic action results on the permanent magnetic side of the stepping motor when the electromagnetic field is relaxed by de-energizing the coil 11. The rotor 12 will accordingly move to a position as indicated by FIG. 3, thereby completing the advance in the clockwise direction for a single pulse step.

The amount of rotation of the rotor 12 is determined by the number of magnetizable slugs 12a carried thereby which coact magnetically with the projections 15a and 16b carried by the pole pieces 15 and 16, respectively. For example, in the preferred embodiments there are twelve peripheral slugs 12a on the rotor 12 and the angular rotation of rotor 12 in response to an energization and deenergization of the coil 11 will be 360° divided by twelve, or 30°.

The stepping motor as described herein is a unidirectional device, but can be built to operate in either a clockwise or counterclockwise direction. The number of steps per revolution depends upon the number of pole piece projections and the number of slugs embedded in the rotor, which can be readily varied to accommodate the stepping motor requirements.

In view of the foregoing, it can be seen that a particularly advantageous means has been provided to accomplish the objects of this invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A stepping motor comprising a circular rotor supported on a shaft having a plurality of peripherally located uniform and angularly distributed magnetizable elements, means for journaling said shaft in relatively frictionless bearings, an electromagnet having a core element with two sets of diametrically disposed pole projections at one end concentrically positioned within the periphery of said rotor, a permanent magnet having a pole piece with a plurality of angularly spaced radially inward extending projections disposed along the outer circumference of said rotor and separated therefrom by an air gap and corresponding to the first set of projections on said electromagnet core and producing a magnetic flux path therein of a given direction, a second pole piece having a plurality of angularly spaced radially inward extending projections diametrically disposed with respect to the permanent magnet pole piece along the outer circumference of said rotor and separated therefrom by an air gap and corresponding to the second set of projections of said electromagnet core, and means for intermittently energizing said electromagnet in such a manner as to create a magnetic flux path in said electromagnet core which is in opposite direction to the magnetic flux path produced by said permanent magnet to cause incremental rotation of said rotor when said electromagnet is magnetized and a similar incremental rotation of said rotor in the same direction produced by said permanent magnet field when said electromagnet is de-energized.

2. A stepping motor comprising a circular rotor supported on a shaft having a plurality of peripherally located uniform and angularly distributed magnetizable elements, means for journaling said shaft in relatively frictionless bearings, an electromagnet having a core element with two sets of diametrically disposed pole projections concentrically positioned within the periphery of said rotor, a permanent magnet having a pole piece with five angularly spaced radially inward extending projections disposed along the outer circumference of said rotor and separated therefrom by an air gap and corresponding to the first set of projections on said electromagnet core and producing a magnetic flux path therein of a given direction, a second pole piece having six angularly spaced radially inward extending projections diametrically disposed with respect to the permanent magnet pole piece along the outer circumference of said rotor and separated therefrom by an air gap and corresponding to the second set of projections of said electromagnet core, and means for intermittently energizing said electromagnet in such a manner as to create a magnetic flux path in said electromagnet core which is in opposite direction to the magnetic flux path produced by said permanent magnet to cause incremental rotation of said rotor when said electromagnet is magnetized and a similar incremental rotation of said rotor in the same direction produced by said permanent magnet field when said electromagnet is de-energized.

3. A stepping motor comprising a circular rotor supported on a shaft having twelve peripherally located uniform and angularly distributed magnetizable elements, means for journaling said shaft in relatively frictionless bearings, an electromagnet having a core element with two sets of diametrically disposed pole projections concentrically positioned within the periphery of said rotor, a permanent magnet having a pole piece with five angularly spaced radially inward extending projections disposed along the outer circumference of said rotor and separated therefrom by an air gap and corresponding to the first set of projections on said electromagnet core and producing a magnetic flux path therein of a given direction, a second pole piece having six angularly spaced radially inward extending projections diametrically disposed with respect to the permanent magnet pole piece along the outer circumference of said rotor and separated therefrom by an air gap and corresponding to the second set of projections of said electromagnet core, and means for intermittently energizing said electromagnet in such a manner as to create a magnetic flux path in said electromagnet core which is in opposite direction to the magnetic flux path produced by said permanent magnet thereby producing an attractive force between said second pole piece and the second set of projections on said electromagnet core and a repelling force between the permanent magnet pole piece and the first set of projections on said electromagnet core to cause an incremental 15° rotation of said rotor when said electromagnet is magnetized and a similar incremental 15° rotation of said rotor in the same direction due to the attractive force between the permanent magnet pole piece and the first set of projections on said electromagnet core produced by said permanent magnet field when said electromagnet is de-energized.

4. A stepping motor comprising a low mass circular rotor having a peripheral rim containing a plurality of uniformly and angularly distributed magnetizable elements, said rotor being supported on a shaft, journaling means for said shaft, a first pole piece positioned on one side of said rotor in coplanar relationship therewith and having a plurality of angularly spaced and radially inward extending projections corresponding to the magnetizable rotor element spacing and arranged to cooperate magnetically with the rotor elements, permanent magnet means for continuously magnetizing said first pole piece, a second pole piece positioned on the diametrically opposite side of said rotor from said first pole piece having a plurality of angularly spaced and radially inward extending projections corresponding to the magnetizable rotor element spacing and arranged to cooperate magnetically with the rotor elements, the projections of said second pole piece being spaced 15° on either side of the diametrically extending center lines passing through the projections of said first pole piece, a cylindrical stator element having a plurality of angularly spaced projections at one end thereof concentrically positioned within the peripheral rim of said rotor in coplanar relationship with same, the projections of said stator element corresponding with the projections of said first and second pole pieces, respectively, but offset therefrom by a predetermined amount, an electrical coil surrounding a portion of said cylindrical stator element, and means for intermittently energizing said coil to produce an electromagnetic field, the torque produced by said electromagnetic field predominating over that field produced by said permanent magnet means and effective to rotate said rotor through a predetermined fraction of one complete revolution and the torque produced by said permanent magnet means upon the de-energization of said coil serving to rotate said rotor through a similar fraction of one revolution in the same direction.

5. A stepping motor comprising a low mass circular rotor having a peripheral rim containing a plurality of uniformly and angularly distributed magnetizable elements, said rotor being supported on a shaft, journaling means for said shaft, a first pole piece positioned on one side of said rotor in coplanar relationship therewith and having five angularly spaced and radially inward extending projections corresponding to the magnetizable rotor element spacing and arranged to cooperate magnetically with the rotor elements, permanent magnet means for continuously magnetizing said first pole piece, a second pole piece positioned on the diametrically opposite side of said rotor from said first pole piece having six angularly spaced and radially inward extending projections corresponding to the magnetizable rotor element spacing and arranged to cooperate magnetically with the rotor elements, the projections of said second pole piece being spaced 15° on either side of the diametrically extending center lines passing through the projections of said first pole piece, a cylindrical stator element having a plurality of angularly spaced projections at one end thereof concentrically positioned within the peripheral rim of said rotor in coplanar relationship with same, the projections of said stator element corresponding with the projections of said first and second pole pieces, respectively, but offset therefrom by a predetermined amount, an electrical coil surrounding a portion of said cylindrical stator element, and means for intermittently energizing said coil to produce an electromagnetic field, the torque produced by said electromagnetic field predominating over that field produced by said permanent magnet means and effective to rotate said rotor through a predetermined fraction of one complete revolution and the torque produced by said permanent magnet means upon the deenergization of said coil serving to rotate said rotor through a similar fraction of one revolution in the same direction.

6. A stepping motor comprising a low mass circular rotor having a peripheral rim containing a plurality of uniformly and angularly distributed magnetizable elements, said rotor being supported on a shaft, journaling means for said shaft, a first pole piece positioned on one side of said rotor in coplanar relationship therewith and having five angularly spaced and radially inward extending projections corresponding to the magnetizable rotor element spacing and arranged to cooperate magnetically with the rotor elements, permanent magnet means for continuously magnetizing said first pole piece, a second pole piece positioned on the diametrically opposite side of said rotor from said first pole piece having six angularly spaced and radially inward extending projections corresponding to the magnetizable rotor element spacing and arranged to cooperate magnetically with the rotor elements, the projections of said second pole piece being spaced 15° on either side of the diametrically extending center lines passing through the projections of said first pole piece, a cylindrical stator element having two sets of diametrically disposed pole projections at one end thereof concentrically positioned within the peripheral rim of said rotor in coplanar relationship with same but separated therefrom by an air gap, the first and second sets of projections on said stator element corresponding with the projections of said first and second pole pieces, respectively, and electrical coil surrounding a portion of said cylindrical stator element, and means for intermittently energizing said coil to produce an electromagnetic field, the torque produced by said electromagnetic field predominating over that field produced by said permanent magnet means and effective to rotate said rotor through a predetermined fraction of one complete revolution and the torque produced by said permanent magnet means upon the de-energization of said coil serving to rotate said rotor through a similar fraction of one revolution in the same direction.

7. A stepping motor comprising a low mass circular rotor having a peripheral rim containing twelve uniformly and angularly distributed magnetizable elements, said rotor being supported on a shaft, journaling means for said shaft, a first pole piece positioned on one side of said rotor in coplanar relationship therewith and having five angularly spaced and radially inward extending projections corresponding to the magnetizable rotor element spacing and arranged to cooperate magnetically with the rotor elements, permanent magnet means for continuously magnetizing said first pole piece, a second pole piece positioned on the diametrically opposite side of said rotor from said first pole piece having six angularly spaced and radially inward extending projections corresponding to the magnetizable rotor element spacing and arranged to cooperate magnetically with the rotor elements, the projections of said second pole piece being spaced 15° on either side of the diametrically extending center lines passing through the projections of said first pole piece, a cylindrical stator element having two sets of diametrically disposed pole projections at one end thereof concentrically positioned within the peripheral rim of said rotor in coplanar relationship with same but separated therefrom by an air gap, the first and second sets of projections on said stator element corresponding with the projections of said first and second pole pieces, respectively, but offset therefrom in a counterclockwise direction by a predetermined amount, an electrical coil surrounding a portion of said cylindrical stator element, and means for intermittently energizing said coil to produce an electromagnetic field, the torque produced by said electromagnetic field predominating over that field produced by said permanent magnet means and effective to rotate said rotor through 15° of rotation and the torque produced by said permanent magnet means upon the de-energization of said coil serving to rotate said rotor through an additional 15° of rotation in the same direction to complete a stepping cycle.

References Cited in the file of this patent

UNITED STATES PATENTS

| | | |
|---|---|---|
| 2,432,600 | Werner et al. | Dec. 16, 1947 |
| 2,518,635 | Peterson | Aug. 15, 1950 |
| 2,754,440 | Brainard | July 10, 1956 |
| 2,780,764 | Morrison | Feb. 5, 1957 |
| 2,867,762 | Lehman et al. | Jan. 6, 1959 |